(12) United States Patent
Poole et al.

(10) Patent No.: US 8,312,451 B2
(45) Date of Patent: Nov. 13, 2012

(54) COMPUTING SYSTEM FOR PROVIDING SOFTWARE COMPONENTS ON DEMAND TO A MOBILE DEVICE

(75) Inventors: Joseph Timothy Poole, Harefield (GB); Rohan Nathaniel Beckles, South Arrow (GB)

(73) Assignee: Univirtua Ireland Limited, Dublin (IE)

( * ) Notice: Subject to any disclaimer, the term of this patent is extended or adjusted under 35 U.S.C. 154(b) by 702 days.

(21) Appl. No.: 12/467,026

(22) Filed: May 15, 2009

(65) Prior Publication Data

US 2009/0282403 A1  Nov. 12, 2009

Related U.S. Application Data

(63) Continuation of application No. PCT/GB2007/004368, filed on Nov. 15, 2007.

(30) Foreign Application Priority Data

Nov. 15, 2006  (GB) .................................. 0622801.9

(51) Int. Cl.
*G06F 9/445* (2006.01)
(52) U.S. Cl. ......... 717/178; 717/168; 717/173; 717/174
(58) Field of Classification Search .................. 717/171, 717/173, 176, 178, 168, 174
See application file for complete search history.

(56) References Cited

U.S. PATENT DOCUMENTS

| | | | | |
|---|---|---|---|---|
| 5,911,071 A * | 6/1999 | Jordan | ........................... | 717/108 |
| 6,279,030 B1 * | 8/2001 | Britton et al. | ................. | 709/203 |
| 6,381,742 B2 * | 4/2002 | Forbes et al. | ................. | 717/176 |
| 6,389,589 B1 * | 5/2002 | Mishra et al. | ................. | 717/170 |
| 6,418,555 B2 * | 7/2002 | Mohammed | ................... | 717/169 |
| 6,681,391 B1 * | 1/2004 | Marino et al. | ................. | 717/175 |
| 6,802,061 B1 * | 10/2004 | Parthasarathy et al. | ........ | 717/173 |
| 6,901,578 B1 | 5/2005 | Beaven et al. | | |
| 6,941,135 B2 * | 9/2005 | Minear et al. | ................. | 455/419 |
| 7,127,526 B1 * | 10/2006 | Duncan et al. | ................. | 709/249 |
| 7,415,707 B2 * | 8/2008 | Taguchi et al. | ............... | 717/174 |
| 7,627,866 B2 * | 12/2009 | Bunker et al. | ................. | 717/168 |
| 7,685,594 B2 * | 3/2010 | Yamamoto et al. | ........... | 717/174 |

(Continued)

FOREIGN PATENT DOCUMENTS

EP  1321853 A2  6/2003

(Continued)

OTHER PUBLICATIONS

Lestideau et al. "Towards Automated Software Component Configuration and Deployment", 2002.*

(Continued)

*Primary Examiner* — Phillip H Nguyen

(57) ABSTRACT

A computing system includes a computer network, a server connected thereto, and a client device for communicating with the server over the computer network. The client device runs an application shell software module providing a dynamically configurable application in a piecemeal manner by individually downloading and running a plurality of software components that are individually stored on the computer network and downloaded/run when needed. The server receives a request for available software components from the application shell software module, controls a search of an index for available software components and transmits a response to the application shell software module providing details of available software components. The application shell software module receives details of available software components from the server, retrieves a selected software component from the location identified by location data for the selected software component, and starts and stops the selected software component within the application shell software module in accordance with received data.

33 Claims, 8 Drawing Sheets

U.S. PATENT DOCUMENTS

| | | | | |
|---|---|---|---|---|
| 7,707,573 | B1* | 4/2010 | Marmaros et al. | 717/178 |
| 7,711,775 | B2* | 5/2010 | Tavis et al. | 709/205 |
| 7,827,546 | B1* | 11/2010 | Jones et al. | 717/173 |
| 7,844,963 | B2 | 11/2010 | Pitzel et al. | |
| 7,853,074 | B2* | 12/2010 | Mischler | 382/163 |
| 2004/0003485 | A1* | 1/2004 | Hosel | 19/105 |
| 2004/0015953 | A1* | 1/2004 | Vincent | 717/173 |
| 2005/0278280 | A1* | 12/2005 | Semerdzhiev et al. | 707/1 |
| 2006/0190608 | A1* | 8/2006 | Sahinoja et al. | 709/227 |

FOREIGN PATENT DOCUMENTS

| | | | |
|---|---|---|---|
| EP | 1717697 | A2 | 11/2006 |
| GB | 2370658 | A | 7/2002 |
| WO | WO 97/00475 | | 1/1997 |

OTHER PUBLICATIONS

Laszewski et al. "Software, Component, and Service Deployment in Computational Grids", 2002.*

European Patent Office, International Search Report for International Application No. PCT/GB2007/004368, mailed Apr. 3, 2008.

Intellectual Property Office, Examination Report for Great Britain Application No. GB0622801.9, dated Dec. 22, 2010.

The Patent Office, Search Report for Great Britain Application No. GB0622801.9, dated Feb. 28, 2007.

Lau, et al, "Code-on-demand and Code Adaptation For Mobile Computing", Apr. 2005, pp. 1-18, The University of Hong Kong, China.

Kawamura, et al., "Global Standardization Activities: Standardization Activity of OSGi (Open Services Gateway Initiative)", NTT Technical Review, Jan. 2004, pp. 94-97, vol. 2, No. 1.

Li, et al., "OSGi-Based Service Gateway Architecture For Intelligent Automobiles", Intelligent Vehicles Symposium, Jun. 6-8, 2005, pp. 861-865 IEEE, USA.

Chen, et al., "SE4SC: A Specific Search Engine For Software Components", The Fourth International Conference on Computer and Information Technology, Sep. 14-16, 2004, pp. 863-868, IEEE, USA.

Unknown, "RFC-0112 Bundle Repository", OSGi Alliance 2005 and Richard S. Hall, Feb. 23, 2006, pp. 1-38.

Coward, et al., "J2EE Client Provisioning Specification Version 1.0", Sun Microsystems, Inc., Aug. 27, 2003, pp. 1-180, USA.

Kant, et al., "A Framework for Classifying Peer-to-Peer Technologies", $2^{nd}$ IEEE/ACM International Symposium on Cluster Computing and the Grid, May 21-24, 2002, pp. 1-8, IEEE, USA.

* cited by examiner

COMPUTING SYSTEM FOR PROVIDING SOFTWARE COMPONENTS ON DEMAND TO A MOBILE DEVICE

CROSS-REFERENCE TO RELATED APPLICATIONS

This application is a continuation of copending International Patent Application Serial No. PCT/GB2007/004368, filed on Nov. 15, 2007, which claims the benefit of the filing date and priority to GB Application No. 0622801.9 filed on Nov. 15, 2006. All of the above applications are incorporated by reference in their entirety.

BACKGROUND

The present invention relates to the provision of software components to client devices such as mobile telephones, personal digital assistants, laptop computers and the like. The invention has particular, although not exclusive relevance to the dynamic component-based delivery, assembly and disposal, in real-time, of software application modules on such mobile computing devices.

There is currently great interest in so-called 'smart phones', mobile electronic devices that offer combinations of once separate and distinct functionalities, such as telephony, email, electronic diary etc, combined within a single device. The need for such devices to be portable requires them to be light weight, relatively small and battery powered. This places stringent limits on both the device itself, for example in terms of processing power and data storage capacity, and on its connectivity, as in network speed and capacity.

One of the inventors has previously proposed (in GB 2370658) to provide Java based components that are instantiated in the memory of a server, serialised and then sent across the network as a serialised in-memory object directly into the memory of the mobile computing device to be run by a Java Virtual Machine on the device. This system offers the advantage that components for software applications do not need to be stored in the mobile device and instead can be downloaded and used when needed. However, this earlier system suffered from a number of problems that made the system unsuitable for a practical implementation. These problems include:

1. the component objects had to be instantiated in memory and then transferred to the client device via a Remote Method Invocation (RMI), which is not secure and exposes the server/mobile computing device to attack as it allows direct access to the memory in the server/mobile computing device;

2. the data transmitted between the mobile device and the server is relatively large due to the need to transmit memory instantiated objects. In particular, the serialisation process not only serialises the given in-memory object but also copies and serialises any other in-memory objects that are used by the target component. For example, a visual component will not only have its own logic serialised, but also the logic that displays and handles its GUI, as well as any other objects it was using at the moment of serialisation. The result in an object that is in fact many times bigger than the original component, and this object now has to be transported across a network to the calling client;

3. the system did not scale as components had to be one of four different types, with each type being described by a single fixed size descriptor object specific to that type; and 4. additionally, instantiation of any object is a CPU-intensive and memory-intensive process. A server receiving 1000 requests per minute would very quickly run out of memory and grind to a halt.

BRIEF SUMMARY

The present invention therefore aims to provide a system which uses an alternative process for the discovery, delivery and activation of software application components. Different aspects of the invention relate to: the description of the components, including their location; the method(s) required to load and activate them; searching for a particular component within one or more repositories according to specific criteria; downloading the particular component; and controlling the lifecycle of the particular component, including loading it dynamically into an already running application and stopping and disposing of the component afterwards.

According to one aspect, the invention provides a component based system in which location and start and stop data for each component found in a search are downloaded to the client and the client downloads a selected component from the corresponding location and starts and stops it using the start and stop data.

According to this aspect, one embodiment provides a mobile computing system comprising: a computer network; a server connected to the computer network; and a portable client device operable for communicating with said server over said computer network; wherein said portable client device is operable to run an application shell software module that provides a dynamically configurable application in a piecemeal manner by individually downloading and running a plurality of software components, each software component being individually stored on the computer network and being downloaded and run when needed; wherein said server is operable to receive requests for available software components from the application shell software module, to control a search of an index for available software components and to transmit a response to said application shell software module providing details of available software components, including, for each software component: i) identification data identifying the software component; ii) location data identifying a location from which the software component can be obtained; and iii) start and stop data identifying how to instantiate the software component; wherein said application shell software module is operable: i) to receive said details of available software components from said server; ii) to retrieve a selected software component from the location identified by said location data for the selected software component; iii) and to start and stop the selected software component within the application shell software module in accordance with the received start and stop data.

In one embodiment the application shell software module is operable: iv) to start the component and, once the component is no longer required, to stop the component in accordance with the start and stop data. Preferably the start and stop data cause the application shell software module to remove the software component from the memory of the client device.

According to this aspect, another embodiment provides a computing system comprising: a computer network; a server connected to the computer network; and a client device operable for communicating with said server over said computer network; wherein said client device is operable to run an application shell software module that provides a dynamically configurable application in a piecemeal manner by individually downloading and running a plurality of software components, each software component for implementing a substantially different part of the dynamically configurable application's functionality, that part being small in relation to the overall size of the dynamically configurable application; wherein said server is operable to receive a request for available software components from the application shell software module, to control a search of an index for available software components and to transmit a response to said application shell software module providing details of available software components, including, for each software component: i) identification data identifying the software component; ii) location data identifying a location from which the software component can be obtained; and iii) start and stop data identifying how to instantiate the software component; wherein said application shell software module is operable: i) to receive said details of available software components from said server; ii) to retrieve a selected software component from the location identified by said location data for the selected software component; and iii) to start and stop the selected software component within the application shell software module in accordance with the received start and stop data.

According to another aspect, the invention provides a component based system in which the client transmits a text string request to the server and the server parses the text string and controls a search for components using the parsing results.

According to this aspect, one embodiment provides a mobile computing system comprising: a computer network; a server connected to the computer network; and a portable client device operable for communicating with said server over said computer network; wherein said portable client device is operable to run an application shell software module that provides a dynamically configurable application in a piecemeal manner by individually downloading and running a plurality of software components, each software component being individually stored on the computer network and being downloaded and run when needed; wherein said application shell is operable to transmit text string requests for available software components, each request comprising text identifying: i) software running on the client device; and ii) hardware of the client device; wherein said server is operable: i) to receive said text string requests for available software components from the application shell software module; ii) to parse the text string request and to generate a query using the text in the request; iii) to control a search of an index for available software components using the query; and iv) to transmit a response to said application shell software module providing details of available software components and where they are located on the computer network; wherein said application shell software module is operable to receive said details of available software components from said server and to retrieve and run a selected software component from the location identified by said server for the selected software component.

According to another aspect, the invention provides a component based system in which the server transmits a text string response to the client and the client parses the text string to get the component location for retrieval of the component.

According to this aspect, one embodiment provides a mobile computing system comprising: a computer network; a server connected to the computer network; and a portable client device operable for communicating with said server over said computer network; wherein said portable client device is operable to run an application shell software module that provides a dynamically configurable application in a piecemeal manner by individually downloading and running a plurality of software components, each software component being individually stored on the computer network and being downloaded and run when needed; wherein said server is operable to receive requests for available software components from the application shell software module, to control a search of an index for available software components and to transmit a text string response to said application shell software module providing details of available software components, including, for each software component: i) text identifying the software component; and ii) text identifying a location from which the software component can be obtained; wherein said application shell software module is operable: i) to receive said text string response; ii) to parse the received text string response to obtain the text identifying the available software components and the text identifying the locations of the available software components; and iii) to retrieve and run a selected software component using the text identifying the location of the selected software component.

According to another aspect, the invention provides a component based system in which an index comprises a descriptor for each component having a plurality of descriptor nodes, each having a plurality of associated attribute key-value pairs and in which a search is performed by matching attribute key-value pairs in the request with those in the descriptors.

According to this aspect, one embodiment provides a mobile computing system comprising: a computer network; a server connected to the computer network; and a portable client device operable for communicating with said server over said computer network; wherein said portable client device is operable to run an application shell software module that provides a dynamically configurable application in a piecemeal manner by individually downloading and running a plurality of software components, each software component being individually stored on the computer network and being downloaded and run when needed; wherein said server is operable to receive requests for available software components from the application shell software module, to control a search of an index for available software components and to transmit a response to said application shell software module providing details of available software components; wherein said index comprises a plurality of descriptors, each descriptor being associated with a respective one of a plurality of software components and comprising a plurality of descriptor nodes each having a plurality of attribute key-value pairs relating to the associated software component; wherein said searching of the index comprises matching attribute key-value pairs defined within said received request with the attribute key-value pairs of each descriptor; and wherein the server is operable to provide, in said response, details of software components for which a match is found between the attribute key-value pairs of the request and the attribute key-value pairs of the associated descriptor; wherein said application shell software module is operable to receive said details of available software components from said server and to retrieve and run a selected software component.

According to another aspect, the invention provides a component based system in which an index comprises a Java descriptor object for each component having a plurality of associated Java attribute objects and in which the search is performed by matching attribute key-value pairs in the request with the Java attribute objects.

According to this aspect, one embodiment provides a mobile computing system comprising: a computer network; a server connected to the computer network; and a portable client device operable for communicating with said server over said computer network; wherein said portable client device is operable to run an application shell software module that provides a dynamically configurable application in a piecemeal manner by individually downloading and running a plurality of software components, each software component being individually stored on the computer network and being downloaded and run when needed; wherein said server is operable to receive requests for available software components from the application shell software module, to control a search of an index for available software components and to transmit a response to said application shell software module providing details of available software components; wherein said index comprises a plurality of descriptor Java objects, each descriptor object being associated with a respective one of a plurality of software components and having a plurality of associated attribute Java objects each defining an attribute key-value pair relating to the associated software component; wherein said searching of the index comprises matching attribute key-value pairs defined within said received request with the attribute Java objects associated with each descriptor Java object; and wherein the server is operable to provide, in said response, details of software components for which a match is found between the attribute key-value pairs of the request and the attribute Java objects of the associated descriptor Java object; wherein said application shell software module is operable to receive said details of available software components from said server and to retrieve and run a selected software component.

As a result of the system described above, the application is deployed piecemeal to the client device, with only the parts that are needed by the user at any particular instant being activated at that time. It is the responsibility of the application container loaded in the client device to load the components that the user currently wants to use and assemble them for use by the user. The components are loaded directly into the client device's memory, assembled and made available for use, thereby having no impact on the local storage of the client device. In this way, the application becomes 'virtualised' and can be expanded and contracted as required.

Preferably the components are 'fine-grained' components that are single purpose units of software as these can be delivered quickly even over slow networks such as GPRS. The use of such fine grained components also reduces delays caused by lengthy testing processes, as each component does not impact on any of the other components in the application. Further, by building an application as a set of fine-grained components, the core application components can be delivered to market whilst additional application features can be created and added later. Further still, with the above system, it is also possible to share or re-use common components among a number of core applications thereby reducing development cost per application. The above system allows for the immediate deployment and availability of components, unlike traditional component-based application platforms. The above system also provides for performance enhancements. In particular, with the new system the server delivers the components to the calling client in stored form, leaving the calling client to handle instantiation. The stored form is much smaller than in-memory form, since it has not loaded any dependencies, and therefore will travel much more quickly across a network. Additionally, the server does not have the burden of handling component Instantiation.

BRIEF DESCRIPTION OF THE ACCOMPANYING DIAGRAMS

These and other aspects of the present invention will become apparent from the following exemplary embodiments that are described with reference to the accompanying figures in which.

DETAILED DESCRIPTION

Overview

Figure 1:
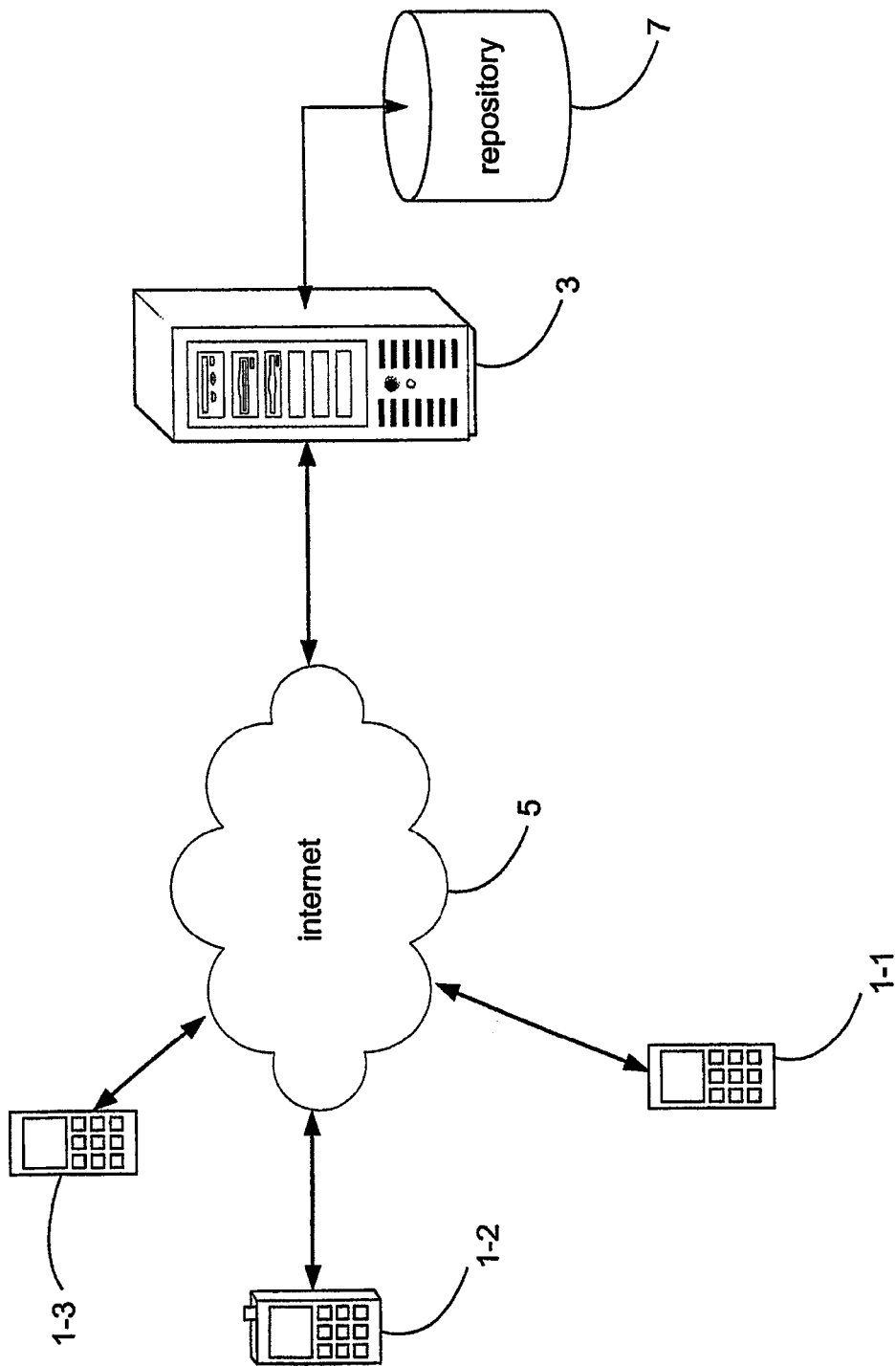
FIG. 1 is a schematic overview of a mobile computing system.

FIG. 1 illustrates a mobile computing system having a number of client devices 1-1, 1-2 and 1-3 (which in this embodiment are mobile telephones) that communicate with a server 3 over a network such as the Internet 5. The server 3 provides the clients 1 with access to a number of software components that are held in a repository 7 and which each implement a substantially different part of a dynamically configurable application. Each software component is a small single purpose unit of code that performs a small part of the overall functionality of the dynamically configurable application. Typically, a banking application may comprise four components, with each component approximately five kilobytes in size, for an overall application size of approximately twenty kilobytes. A graphically or multimedia intensive application, such as a casino application, may be approximately eighty kilobytes in size, with the majority being the multimedia data as opposed to executable logic.

In operation, when a user of a client device 1 initiates a software application on the device 1, the client device 1 creates and sends a text string request to the server 3 over the Internet 5 requesting details of software components that are currently available. The text string includes details of the client device 1, such as device make and model, screen size and resolution, operating platform etc as well as user subscription details and user interests. The server 3 parses the received text string and forms a database query for querying the repository 7 to locate details of software components that are relevant for the particular client device 1, user subscription and user interests. The server 3 then generates a text string response that includes details of the available software components and where they are stored; details of how each component should be loaded and started in memory; and details of how each component should be stopped and removed from memory. The client device 1 then uses the response to populate a component data table for each software component and displays the available components to the user. In response to the user selecting one of the software components, the client device 1 uses a standard file transfer protocol to retrieve the software component from the storage location defined in the component data table for the selected component. The client device 1 then loads and starts the software component in accordance with the load and start data stored in the component data table for the selected software component and, once the user has finished using the component or requests use of another component, stops and removes the component from memory in accordance with the stop and remove data stored in the component table for the selected software component.

In this way, the individual software components do not need to be stored on the client device 1 before being selected to be run by the user. This reduces the storage and processing burden on the client device 1 and allows components to be updated centrally within the repository 7, without the need to update any software on the client devices 1. Further, since the client device 1 requests details of the components that are currently available before displaying selectable components to the user, the system can be updated to include new components (ie new or improved functionality) which can be offered to the client device 1 when the user next uses the system.

Client Device

Figure 2:
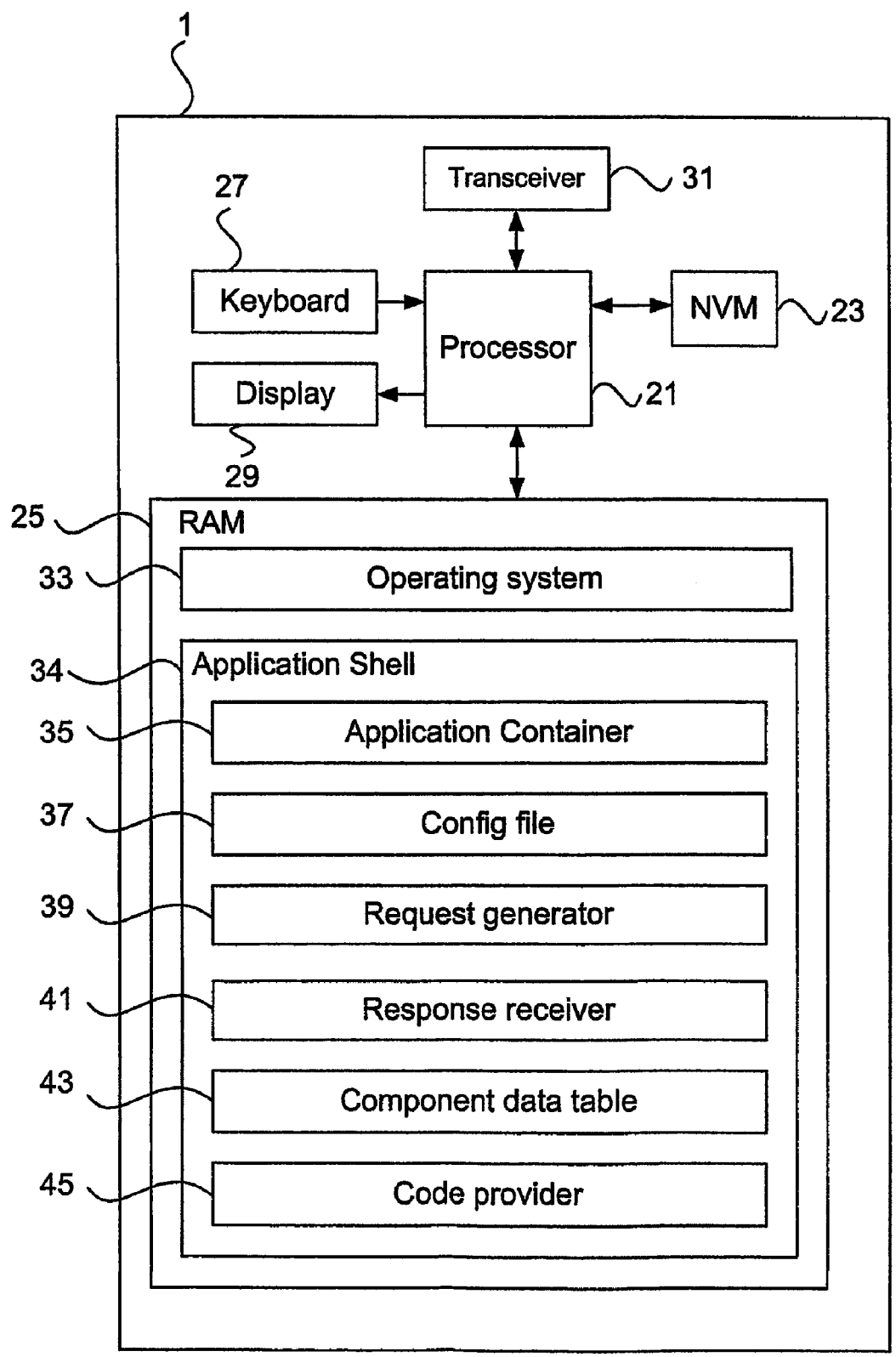
FIG. 2 is a block diagram illustrating the main parts of a client device forming part of the system shown in FIG. 1.

FIG. 2 is a block diagram illustrating the main parts of one of the client devices 1 of the system shown in FIG. 1. As shown, the client device 1 comprises: a processor 21 for controlling the operation of the client device 1; non-volatile memory (NVM) 23 for permanent storage of user data and software such as the operating system and user applications; volatile random access memory (RAM) 25 in which software to be run is loaded from the NVM 23; a keyboard 27 for allowing the user to interact with the software running on the client device 1; a display 29 for displaying information and prompting the user for user input to control the software running on the client device 1; and a transceiver 31, such as a wireless network card, for controlling the transmission and reception of data to and from the network 5. FIG. 2 illustrates the state of the client device 1 when the operating system 33 and an application container 35 that operates in accordance with the present invention have been loaded into the RAM 25. FIG. 2 also shows a number of other software modules and data files that are loaded into RAM 25 when needed by the application container 35. A brief description of what each software module (except the operating system 33) does and what each data file holds will now be given:

Application container 35—is a software program which provides some basic functionality and whose functionality can be extended by software components downloaded from the network 7.

Config file 37—this is a text file, containing configuration information for or about the client, including:
  details of the client hardware, software platform and version etc;
  user 'interests', such as 'banking';
  user subscription data;
  the uniform resource locator (URL) of a component server;
  details of what component information will be required in order to complete fields in a component data table, described below Request generator 39—is a software module which constructs and sends client requests to the component server 3 identified in the config file.

Response receiver 41—is a software module which receives the server's response to the client request sent by the request generator 39 and which populates a component data table for each component.

Component data table 43—is a data structure which contains key-value pairs, received from the server 3, relating to a component. In particular, it details where a component is located, how is to be activated, stopped and disposed of.

Code provider 45—is a software module which retrieves specific components from the network 7 when instructed to do so by the application container 35.

Server

Figure 3:
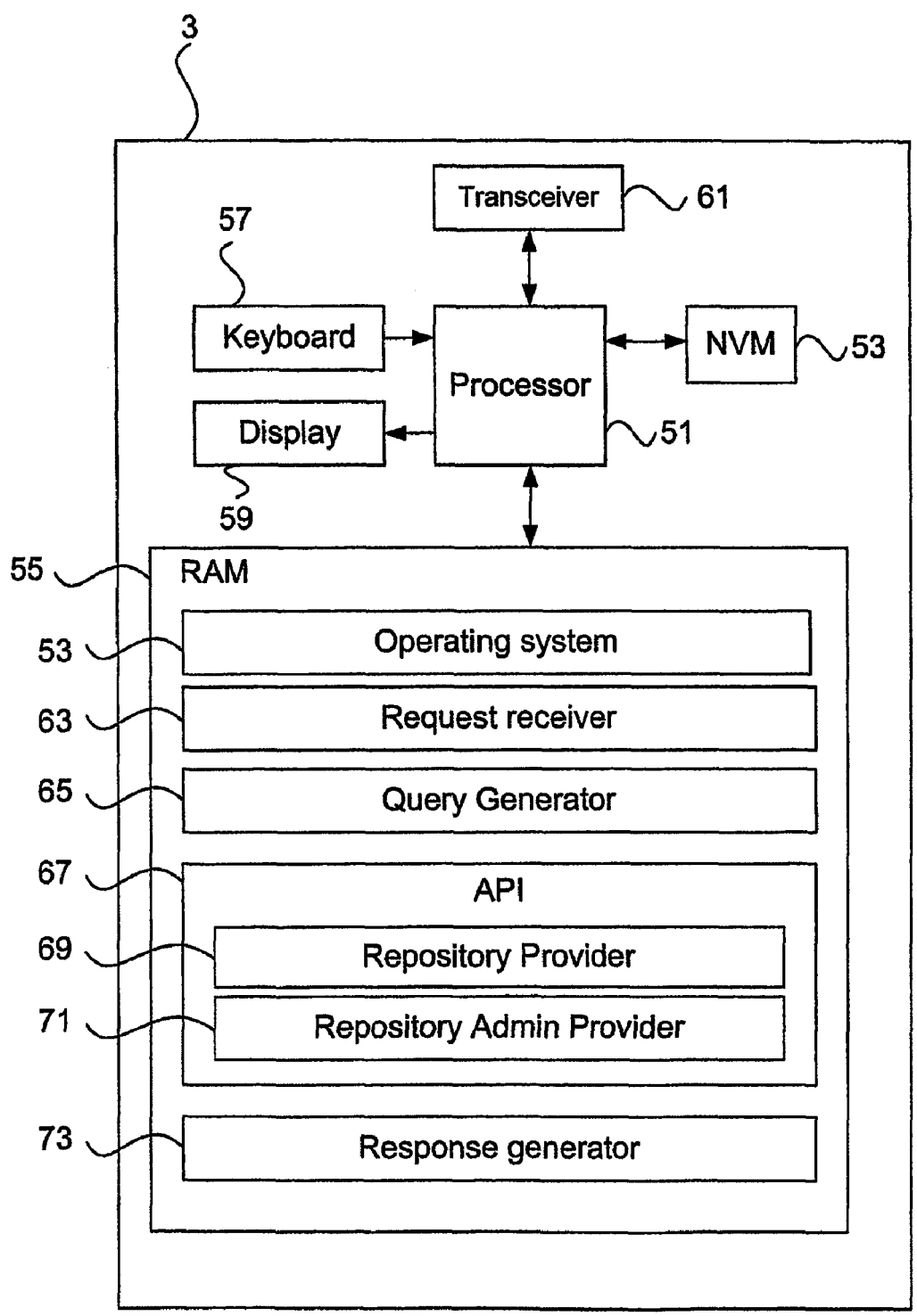
FIG. 3 is a block diagram illustrating the main parts of a server forming part of the system shown in FIG. 1.
Figure 4:
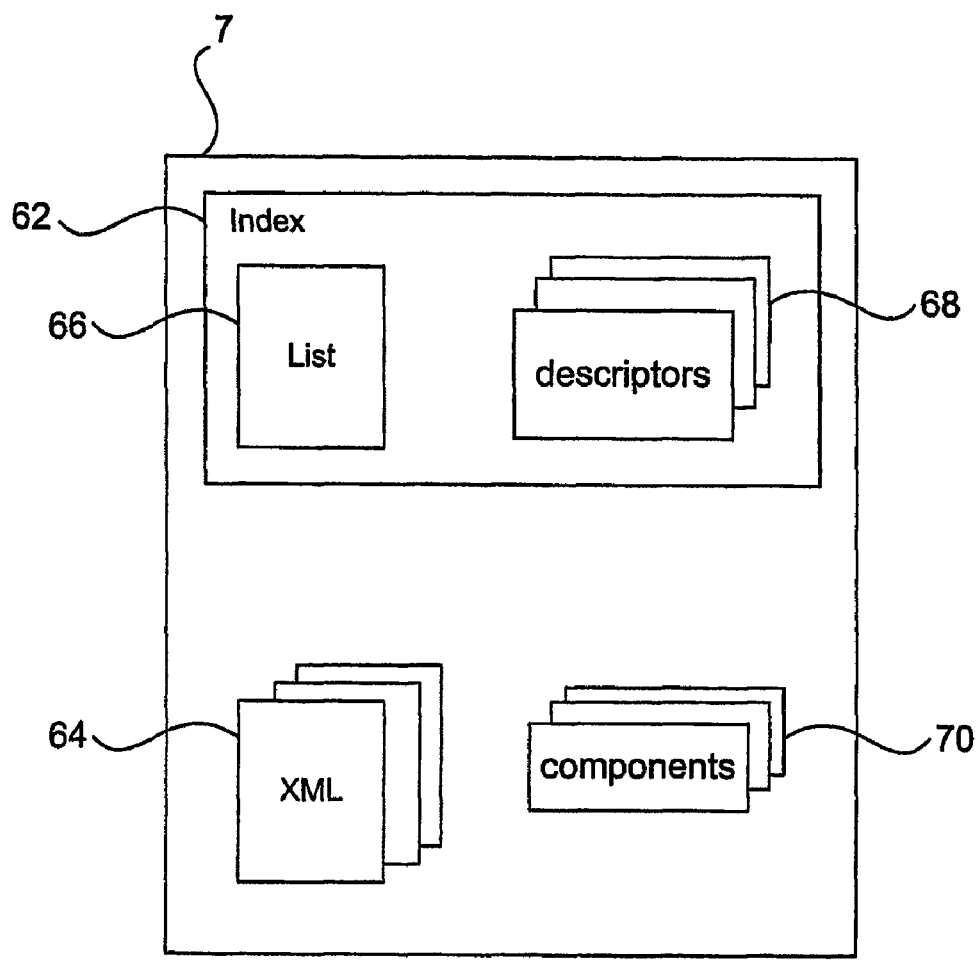
FIG. 4 is a block diagram illustrating the main parts of a repository forming part of the system shown in FIG. 1.

FIG. 3 is a block diagram illustrating the main parts of the server 3 of the system shown in FIG. 1. As shown, the server 3 comprises: a processor 51 for controlling the operation of the server 3; non-volatile memory (NVM) 53 for permanent storage of user data and software such as the operating system 53 and server applications; a random access memory (RAM) 55 in which software to be run is loaded from the NVM 53; a keyboard 57 for allowing an administrator to interact with the software running on the server 3; a display 59 for displaying information; and a transceiver 61, such as an Ethernet network card, for controlling the transmission and reception of data to and from the network 5. FIG. 3 also illustrates the main software modules run by the server 3 during use. These software modules include:

Request receiver 63, which receives requests transmitted from the clients and parses them to extract the client device information, the user subscription information and the user interests information contained in each request.

Query generator 65—which uses the information extracted by the request receiver 63 to determine suitable query terms which it assembles into a suitable query for identifying appropriate components.

Application Program Interface (API) 67, which comprises two relevant sub-modules, a repository provider module 69 and a repository admin provider 71. The repository provider module 69 accepts the query supplied by the query generator 65, and uses it to interrogate an index stored in the repository 7 (which may be local to the server or stored at some other location on the network 5). The repository admin provider module 71 maintains the index stored in the repository 7, keeping it updated with details of new components as they are added to the system and to remove old components as they are removed from the system.

Response generator 73—which generates the responses to the client requests from the results of the interrogation of the index in the repository 7 and returns the responses to the corresponding client device.

Respository

In this embodiment the repository 7 comprises a set of XML files 64, one for each component 70, and an index 62 for the XML files 64. The index 62 includes a list 66 identifying the XML files 64 associated with each of the different application packages (user interests). When a request from a client device 1 is received it will include the name of the package to which the request relates. This package information is used to identify, from the list 66 of the index 62, the component descriptors against which the received request will be compared. In this embodiment the received request is not compared directly with the XML files 64 but instead with an in-memory internalised version of these XML files (i.e. the descriptors 68) which are also stored as part of the index 62. The XML file 64 for a particular component 70 is internalised once and a Boolean flag is associated with the XML file to indicate that is has already been internalised and does not need to be internalised again for later searches. Newly-added components 70 will have their associated XML files 64 internalised as required.

A particular component 70 can potentially belong to multiple applications. For example, a component to implement a custom secure network protocol could have package_name values of "Banking", "Casino" and "Messaging".

Information on which components 70 belong to which package or packages is determined at start-up of the repository 7. All the component XML files 64 are text searched for the package_name field, and grouped according to package_name within a two-dimensional data table that defines the above list 66.

Figure 5:
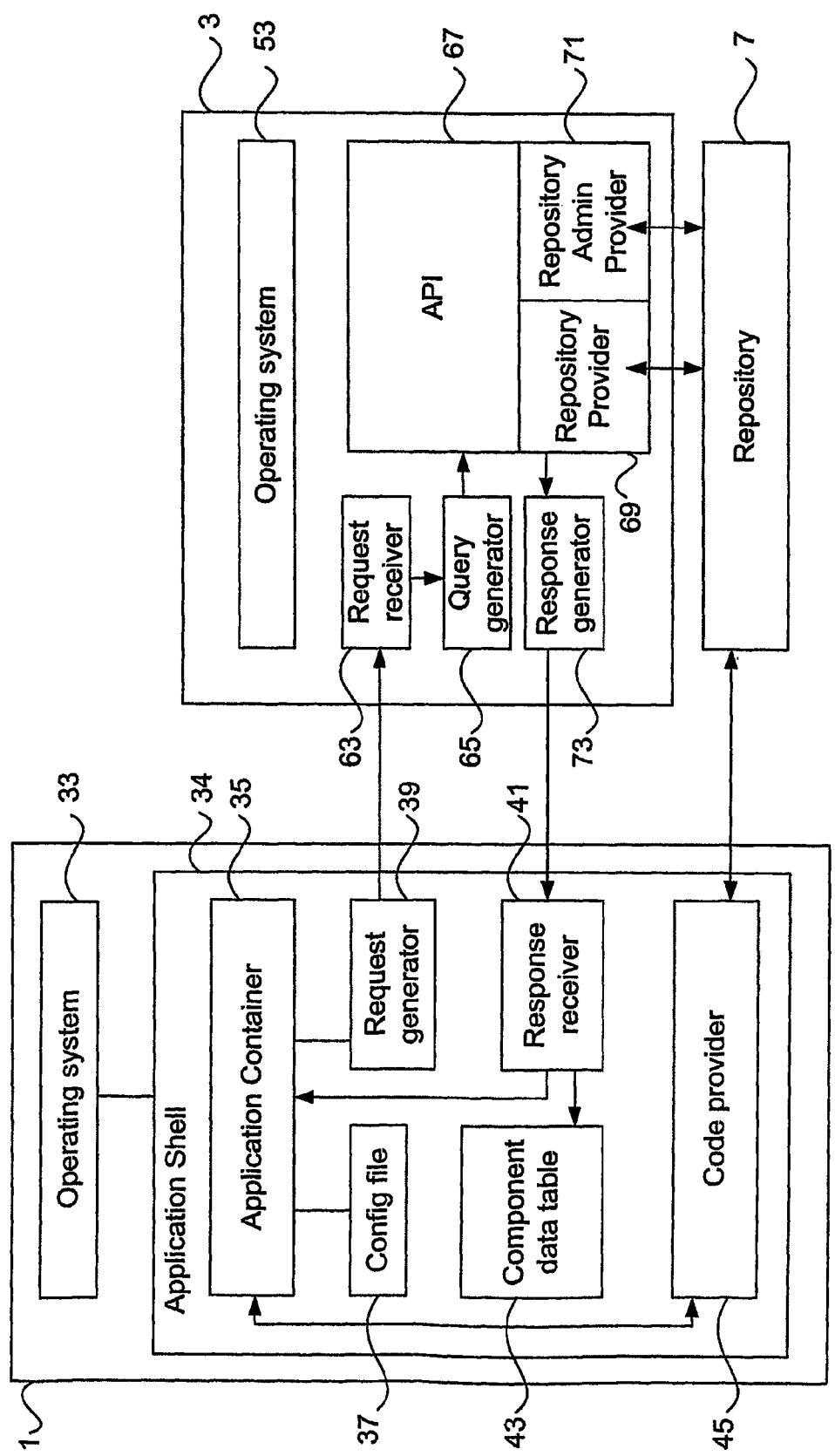
FIG. 5 illustrates the functional flow of data in the mobile computing system embodying the present invention.

A brief description has been given above of the main parts of the mobile computing system embodying the present invention. A more detailed description will now be given of the way in which the system operates, with reference to FIG. 5. This description will be given in relation to a specific "Banking" application. As those skilled in the art will appreciate, the system can be used for many other applications.

System Operation

Upon the user selecting the Banking application on the client device 1, the Banking application container 35 is loaded from NVM 23 to RAM 25 and run. When run, the Banking application container 35 loads the Banking client config file 37 into the RAM 25 and updates the client device information in the config file as necessary.

For applications where it is deemed important to confirm the identity of the user, such as the Banking application, the application container 35 will perform an authentication stage in which the user is requested to input a user name and password. The information provided by the user via the keyboard 27 can then be verified by the Banking application container 35, for example by comparing it with pre-stored data held by the server 3.

Once the identity of the user has been verified, the Banking application container 35 loads the request generator module 39 into RAM 25 and passes it the updated config file 37. The request generator module 39 uses the information in the config file 37 to generate a request which it sends to the server 3 identified in the config file 37. In this embodiment, the request is sent as a plain text string as part of an Hyper Text Transfer Protocol (HTTP) command string, and comprises details of the client device 1, such as the hardware and software; details of the client interest (package), such as Banking and a request for lifecycle control information, ie. details of what component information is required by the client device 1 to run the component, such as the name of the component, where it is stored (its URL), how it should be initialised and started and how it should be stopped and removed from memory. For the Banking application of the present embodiment, the generated request will have the following form:

```
http://www.testserver.com/servlet/ComponentServlet?command=
discover&package_name=Banking&arch=Java&arch_version=
2&edition=ME&edition_version=1.0&profile=
PersonalProfile&profile_version=1.1&component_name=
&method_init=&method_start=&method_stop=
&method_dispose=d1spose
```

When this HTTP command string (request) is sent over the Internet 5, it is received by the server 3 identified in the HTTP command. The request is passed to the request receiver 63, which parses the request into its constituent attribute key-value pairs as identified between the delimiters (&) in the HTTP command. In particular, the request receiver 63 processes the received HTTP command to find the first '&' delimiter. It then identifies a first attribute key as the text between this first '&' delimiter and the next '=' sign in the command. The request receiver 63 then determines the attribute value (if known) from the text between this '=' sign and the second '&' delimiter. For the request given above, this will yield the attribute key value pair package_name=Banking. The request receiver 63 continues processing the received request in this way, until there are no more '&' delimiters in the HTTP command. Each of the attribute key-value pairs identified in this way will be used to form a suitable query term for application to the index stored in the repository 7. However, for the attributes relating to the component information, the corresponding attribute value will not be in the client request as it is not known (and is the information to be determined from the server 3 for any components 70 matching with the attribute key-value pairs received in the request). These attribute values are not added to the query. Instead, they are kept separately for subsequent processing by the response generator 73, as will be described in more detail below.

Figure 6:
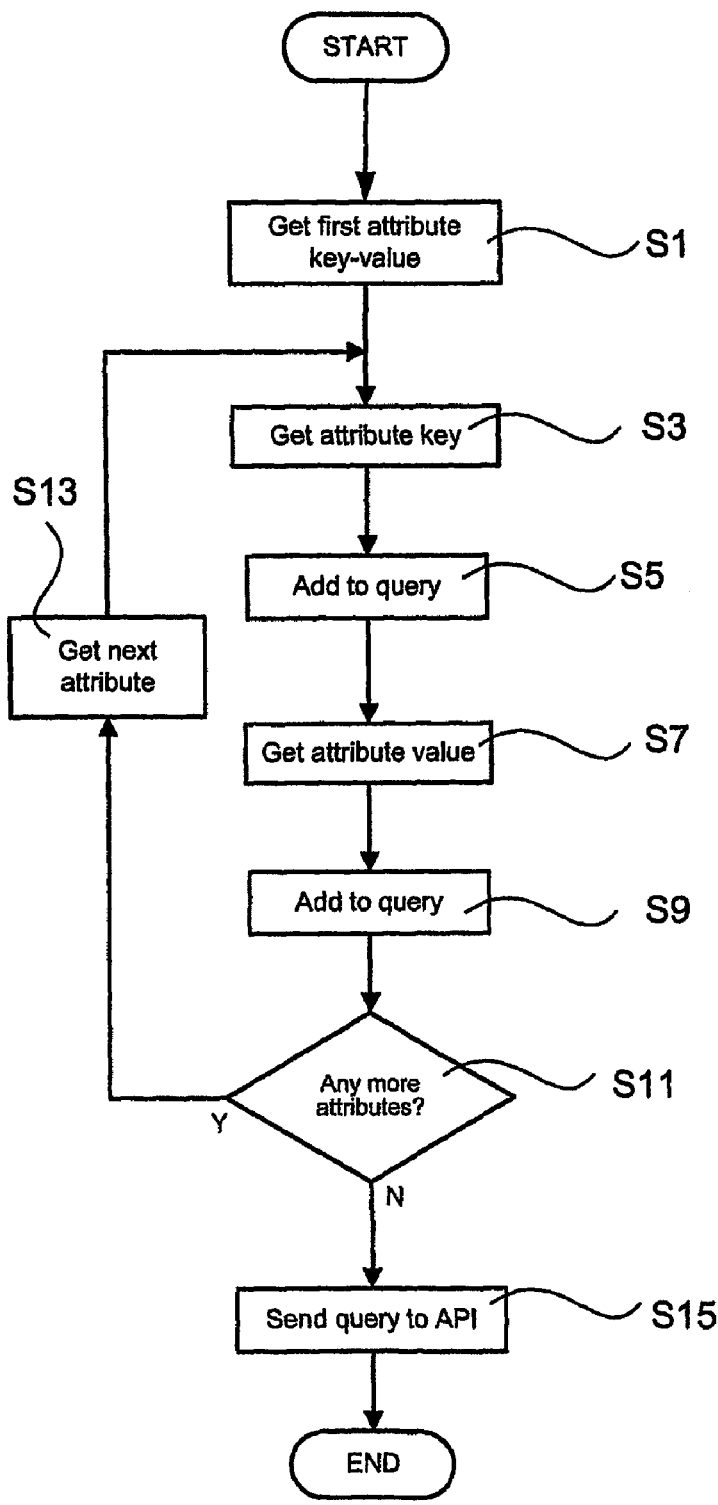
FIG. 6 is a flow chart illustrating a method used in the server to build a query from a number of query terms.

The resulting attribute key-value pairs obtained from the request receiver 63 are passed to the query generator 65 which uses them to assemble a suitable query (comprising a query term for each attribute key-value pair) for application to the index stored in the repository 7. FIG. 6 illustrates the process of building a query from the attribute key-value pairs. As shown, in step S1, the query generator 65 obtains the first attribute key-value pair. In step S3 it extracts the attribute key and, in step S5 adds it to the database query, which is built in a text buffer (not shown). Then, in step S7 the query generator 65 extracts the attribute value of the key-value pair and adds it, in step S9, to the query. This processing is then repeated for each attribute key-value pair obtained from the received client request. The resultant query is then forwarded, in step S15 to the API 67.

In addition to adding the attribute keys and values, the query generator 65 adds appropriate database delimiters used by the repository 7, which will depend on the type of database used. These database delimiters will be known to those skilled in the art of databases and a further description thereof will be omitted.

The server API 67 uses the received query to find component descriptors 68 that match the query terms in the index 62 stored in the repository 7. The API 67 uses the repository provider 69 to carry out this matching operation. As discussed above, the user's query is not searched against all of the component descriptors 68 contained within the repository 7. The value of the package_name attribute contained in the received request is used to address a list 66 stored in the index 62. This identifies the subset of the components 70 within the repository 7 that can be called by the application container. A check is then made to determine if an in-memory internalisation of the XML file 64 (i.e. a descriptor 68) for each of those components 70 is already within the index 62 (with reference to the above described Boolean flags associated with the XML files 64). Any XML files 64 that have not yet been internalised are internalised at this point and then the attribute key-value pairs in the received query are compared with attribute-key value pairs defined by these in-memory internalised component descriptors 68.

In this embodiment, generic in-memory internalised Java descriptor objects are used to describe each software component 70. These descriptor objects 68 are programmatic representations of the metadata used to describe a component, with each descriptor 68 containing a number of Java attribute objects, each associated with one of the above attribute key-value pairs. In this embodiment, the in-memory internalised descriptors 68 are arranged in a tree structure to facilitate the comparison between the query terms of the query and the attribute objects associated with the descriptor 68 for each component 70.

Figure 7:
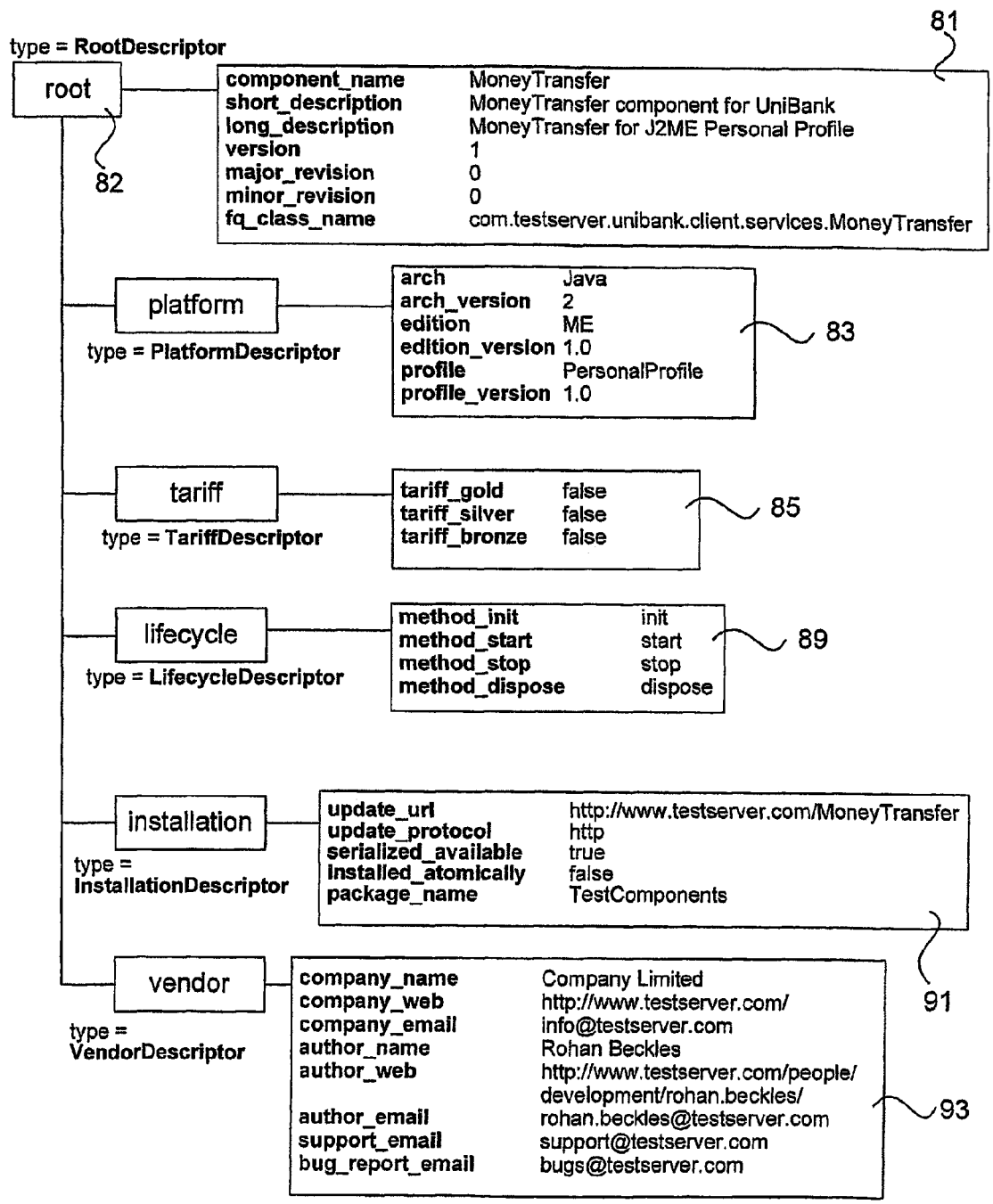
FIG. 7 is a schematic diagram illustrating the in-memory representation of a logical tree data structure used to locate components in the system shown in FIG. 1.

FIG. 7 illustrates the internalised, in-memory form of a descriptor object 68 for a component 70, and the way in which it is arranged in a tree structure. The illustrated descriptor object 68 is for the component 70 named "Money Transfer" that will allow the user of the client device 1 to transfer money from his account to another account. As shown, the attribute objects associated with this Money Transfer component include:

attribute objects 81 identifying the name, short and long descriptions, version and Java class name, which are associated with the root descriptor 82 for the component;

attribute objects 83 relating to the platform on which the component is intended to run, such as Java version 2 and ME edition version 1.0;

attribute objects 85 relating to any restrictions on user subscription levels.

attribute objects 89 relating to the lifecycle of the component, in other words how to initialise, start and stop the component, and how to remove the component from memory;

attribute objects 91 relating to where the object is stored (its URL) and how it should be installed attribute objects 93 relating to the vendor, identifying the owner and author of the component and how to contact them.

A similar descriptor 68 is provided for each of the different versions of the same component and for all the different components offering different functionality and the different descriptors 68 each have their own root descriptor 82. There is no limit to the number of descriptors and attributes associated with a particular component, thereby allowing for an arbitrarily fine granularity of description for each component. Comparing a query against this index 62 of descriptors 68 effectively involves finding the root descriptors 82 (and dependent descriptors) that have attribute objects that match with all the query terms in the query.

As will be apparent from FIG. 7, descriptors are primarily used to group attributes, although descriptor objects programmatically inherit from attribute objects and can therefore also be treated as attribute objects. This can be used, for example, by a management tool to find all components 70 that have or do not have a certain descriptor 68.

In this embodiment, the descriptors and the attributes are all Java objects that perform the appropriate comparison and return a match or no match response. The repository provider 69 then passes the details of the components 70 that return a positive match with the input query to the response generator 73, which reformats the search results into a client response. In particular, for each matching component descriptor 68, the unknown attribute values in the client request are obtained from the attribute objects in the component's descriptor 68.

Figure 8:
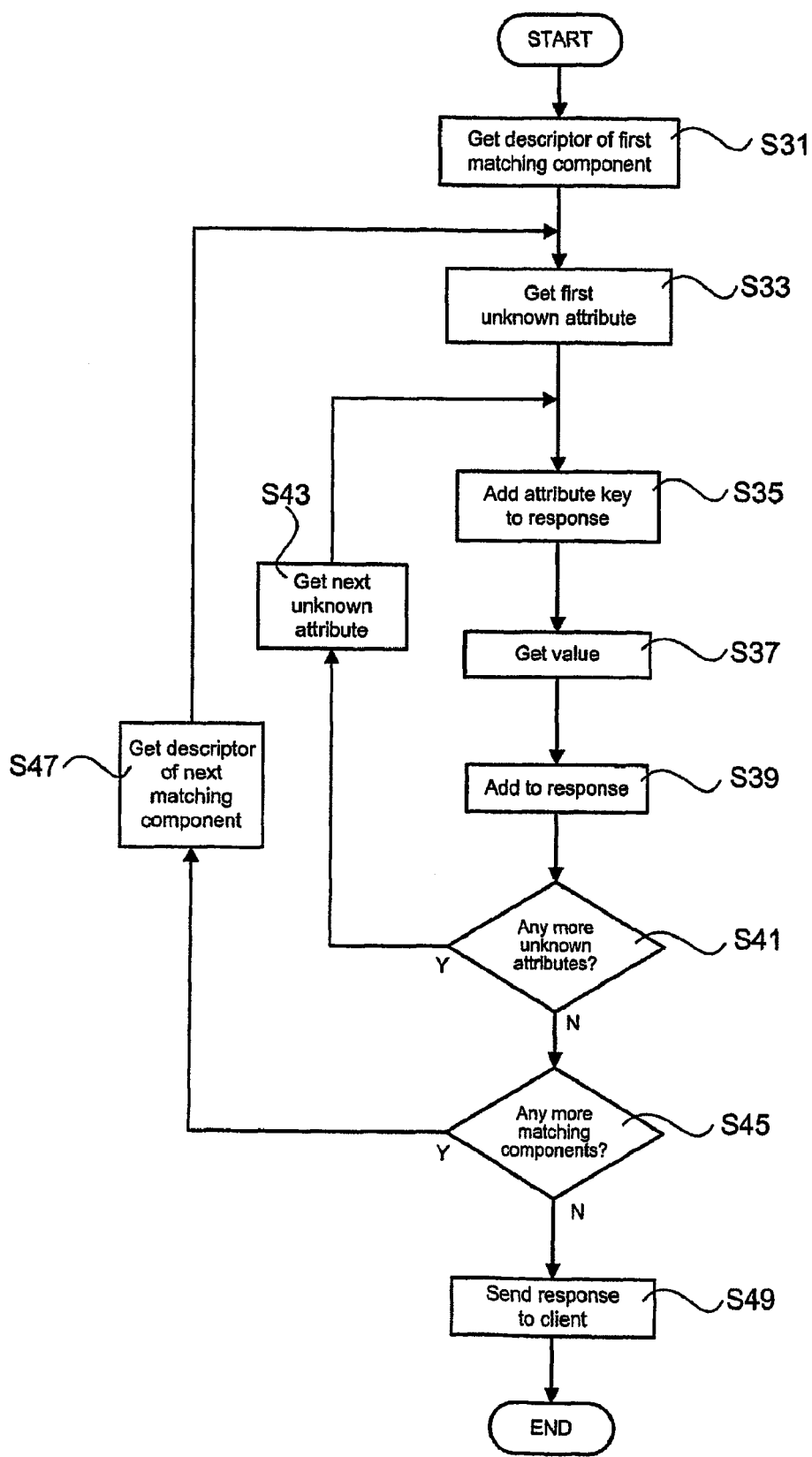
FIG. 8 is a flow chart illustrating a method used in the server to build a response to a query.

FIG. 8 illustrates this process of building the response to the client query. As shown, in step S31, the response generator 73 obtains the descriptor 68 of the first matching component 70 identified by the repository provider 69. Then, in step S33 the response generator 73 obtains the first unknown attribute (ie the first attribute key for which the value is not known) from the original client request, as identified by the request receiver 63 when it parsed the client request. In step S35 the text of the attribute key is appended to the response. The processing then proceeds to step S37 where the value of the current attribute is obtained from the descriptor 68 of the current component 70. This text value is then appended, in step S39, to the response. The processing then proceeds to step S41, where a check is made to see if there are any more attributes in the client request for which the attribute value is unknown. If there are then the processing proceeds to step S43, where the next unknown attribute is obtained from the request receiver. The processing then returns to step S35 as before. Once all the unknown attribute values have been found from the current component descriptor 68, the processing proceeds to step S45, where the response generator 73 determines if there are any more matching components 70. If there are, then the processing proceeds to step S47, where the descriptor 68 for the next matching component 70 is obtained. The processing then returns to step S33 where the same processing is carried out to find the unknown attribute values from this new descriptor 68. Once all the matching components 70 have been processed in the above manner, the response will have been generated and it is sent back to the client device 1 in step S49.

When generating the response, the response generator 73 will tailor the response to the particular client device 1 that made the request, according to details of the client device 1 hardware and software capabilities, either determined from the received client request, or as deduced from the characteristics of the client request.

The results of requests are returned to the client device 1 as individual lines of text, one generated for each matching component 70, with each line being delimited by a '!' delimiter. A search request that finds four components will therefore result in four lines of text being returned to the client device.

For the client request transmitted above, a typical response generated by the response generator 73 will include the following text for a "Money Transfer component:

```
!component_name=moneytransfer&classname=
com.testserver.unibank.wwwbank.MoneyTransfer&location=
http://www.testserver.com/MoneyTransfer.jar&method_init=
int&method_start=start&method_stop=
stop&method_dispose=dispose
```

As can be seen from the above response text for the component begins with an initial '!' delimeter, followed by the attribute key-value pairs associated with that component being delimited from each other by the '&' delimiter. The response will also include routing information (not shown) to ensure the response is correctly forwarded from the server 3 across the network 5 to the client device 1.

The response transmitted from the server 3 is received by the response receiver 41 in the client device 1. The response receiver 41 parses the response using the delimiters '!' and '&' to separate out the attribute key-value pairs for each component. The response receiver 41 then uses the parsed data to create and fill in the entries of a component data table 43 for each matching component. The component data table 43 for the Money Transfer component is shown below:

TABLE 1

| Key | value |
| --- | --- |
| component_name | Money Transfer |
| fq_class_name | com.testserver.unibank.client.services.MoneyTransfer |
| method_init | init |
| method_start | start |
| method_stop | stop |
| method_dispose | dispose |
| URL | http://www.testserver.com/MoneyTransfer |

Once the response receiver has processed the response and generated the component tables 43, it informs the application container 35, which uses the component name fields in each table 43 to generate a display of the available components 70 for display to the user on the display 29. The list of available components may be presented in the form of a menu on the display 29 from which the user can select the desired component 70 to run.

Upon user selection of a component 70 (for example via the keyboard 27), the application container 35 instantiates the code provider module 45 into RAM 25 and informs it of the component 70 that has been selected by the user. The code provider module 45 then retrieves the URL of the selected component from the component data table 43 for the selected component. The code provider module 45 then retrieves the selected component from the Internet 5 using the retrieved URL. This may be achieved using conventional Internet protocols such as FTP. In this embodiment, components are retrieved in 'stored' form rather than as 'serialised' memory objects. This significantly reduces the amount of data that has to be downloaded over the Internet 5 as memory instantiated objects are always larger than their stored counterpart. Furthermore, sending the components 70 in 'stored' form avoids a potential security risk of using RMI, in which an in-memory object on one computer can be directly accessed and manipulated by an in-memory object on another computer.

The retrieved component is then passed to the application container 35, which instantiates the component in the RAM 25. Once instantiated, the component is initialised and started in accordance with it's initialise and start methods defined in its component data table 43 and the functionality provided by the downloaded component is provided to the user. In this example, the functionality allows the user to transfer money from one account to another.

In this embodiment, the downloaded component may allow the user to download other components. In particular, a component can itself search for other components that it needs, by making a distinct search request to the server 3, independently from the application container 35. In order to provide scalability, these requests are not hard-coded into the component's logic, but instead are of a similar form to those described above. For example, if the Money Transfer component can call other components then it first makes a configuration request to the server 3, of the form:

```
.../servlet/ComponentServer?command=get_config&component_name=
MoneyTransfer&arch=Java&arch_version=2&edition=
ME&edition_version=1.0&profile=PersonalProfile&profile_version=1.0
```

In response, the server 3 will send back to the calling component a search config file. This config file can be held in the component's metadata (stored at the server) and updated by a system administrator, or it could be held in the server in a separate config file.

The search config file includes general configuration data for the component (such as server details) and configuration data that determines the type of components that the Money Transfer component is permitted to search for. For example the search config file may include:

```
!config&host=www.testserver.com&port=
80!search_config&package_name=
MoneyTransfer_Support,Banking_Support
```

In this example, the MoneyTransfer component is told by the server 3 that it can search for components 70 that belong to the "MoneyTransfer Support" and "Banking_Support" application package.

The Money Transfer component then uses this information in the received search config file to format a suitable request for the server, to find available components that it can call. Such a subsequent request may have the following form:

```
.../servlet/ComponentServer?command=discover&arch=
Java&arch_version=2&edition=ME&edition_version=
1.0&profile=PersonalProfile&profile_version=1.0&package_name=
MoneyTransfer_Support,Banking_Support
```

In response, the server 3 will perform a similar search to the one described above and return the component data for the components 70 that the Money Transfer component can call. In this embodiment, the Money Transfer component uses the received component data to populate a new set of component data tables 43 in the manner described above. The Money Transfer component then uses the information in these component data tables 43 to display to the user the components 70 that can be called and to retrieve the selected component once selected by the user.

Any components 70 downloaded and activated by the MoneyTransfer component are then instantiated within the memory space of the MoneyTransfer component and are controlled by it. Having a hierarchical system of components contained within the calling components in this way provides for significantly easier management than having all the components 70 coexist in the application container 35 independently.

Once the user has finished using the downloaded component, the application container 35 (or the calling component) terminates or stops the downloaded component in accordance with the stop method defined in the component data table 43 for the downloaded component and the memory is freed for use by other processes. More specifically, the application container 35 (or the calling component) has the downloaded component implement the appropriate dispose method (as defined in its component data table 43), which frees all resources used by that component, such as network channels or references to other components 70 that the component in question has activated. Once the dispose method has completed, the application container 35 (or the calling component) deletes any references it has to that component. Once a component has no active references pointing to it, the system garbage collector (as implemented by the underlying platform, such as Java or .NET) will remove the component from memory.

As will be apparent to those skilled in the art, the above system offers a number of significant advantages over more conventional systems where the software is stored and run on the client device 1. For example, by downloading the available software components 70 at run-time, it is not necessary to store all components 70 for the software that the user might want to use. Instead, only the components 70 that the user wants to use are downloaded and run on the client device 1.

This frees up valuable storage space for user data such as music, images and video. Additionally, as the software components 70 are stored in a repository 7, which may be stored on the server 3 (or in some other server on the Internet 5), it is easier to update the components 70 if they have bugs and need to be replaced or to add new functionality to existing components 70. In particular, as the components 70 are not permanently stored on each client device 1, it is not necessary to update each client device 1 each time a modification is made to a component. The software component only has to be modified once in the repository 7.

In addition to the ability to modify and update existing components 70, the system described above offers the advantage that software developers can develop new components 70 and these can be made available to the client devices 1 simply by adding a new descriptor 68 to the index 62 that is searched by the repository provider 69. Similarly, if functionality is to be removed from users, then the components 70 that provided that functionality can be made unavailable simply by removing the descriptor 68 for that component 70 from the index 62 that is searched by the repository provider 69 in this embodiment, the repository admin provider 71 maintains the index 62 stored in the repository 7, keeping it updated with details of new components 70 as they are added to the local and/or remote repositories 7.

One of the advantages of using the tree structure for the descriptor 68 for each component 70 (as illustrated in FIG. 7) is that it allows the object based descriptor 68 to be generated automatically by the repository admin provider 71 from an XML file 64 that describes the component 70. For example, the following is an XML file 64 for the Money Transfer component descriptor 68 illustrated in internalised, in-memory form in FIG. 7:

```
<?xml version="1.0"?>
<!-- DTD for Vanilla CMI v1.0 --><!-- The root element is CMI --><!--
Declaration for Descriptor entity --><!-- Declaration for
DescriptorSequence entity --><!-- Declaration for Attribute entity --
>
<CMI xmlns:CMI="testserver.com/vanilla~cmi" version="1.0">
    <CMI:Descriptor name="root" type="RootDescriptor">
    <CMI:Attribute name="component_name"
ordered="false">MoneyTransfer</CMI:Attribute>
    <CMI:Attribute name="short_description"
ordered="false">MoneyTransfer component for UniBank</CMI:Attribute>
    <CMI:Attribute name="long_description"
ordered="false">MoneyTransfer for J2ME Personal
Profile</CMI:Attribute>
    <CMI:Attribute name="version"
ordered="false">1</CMI:Attribute>
    <CMI:Attribute name="major_revision"
ordered="false">0</CMI:Attribute>
    <CMI:Attribute name="minor_revision"
ordered="false">0</CMI:Attribute>
    <CMI:Attribute name="fq_class_name"
ordered="false">com.testserver.unibank.client.services.-
MoneyTransfer</CMI:Attribute>
    <CMI:Descriptor name="platform" type="PlatformDescriptor">
        <CMI:Attribute name="arch"
ordered="false">Java</CMI:Attribute>
        <CMI:Attribute name="arch_version"
ordered="false">2</CMI:Attribute>
    <CMI:Attribute name="edition"
ordered="false">ME</CMI:Attribute>
        <CMI:Attribute name="edition_version"
ordered="false">1.0</CMI:Attribute>
        <CMI:Attribute name="profile"
ordered="false">PersonalProfile</CMI:Attribute>
        <CMI:Attribute name="profile_version"
ordered="false">1.0</CMI:Attribute>
    </CMI:Descriptor>
    <CMI:Descriptor name="tariff" type="TariffDescriptor">
        <CMI:Attribute name="tariff_gold"
ordered="false">false</CMI:Attribute>
        <CMI:Attribute name="tariff_silver"
ordered="false">false</CMI:Attribute>
        <CMI:Attribute name="tariff_bronze"
ordered="false">false</CMI:Attribute>
    </CMI:Descriptor>
    <CMI:Descriptor name="lifecycle" type="LifecycleDescriptor">
        <CMI:Attribute name="method_init"
ordered="false">init</CMI:Attribute>
        <CMI:Attribute name="method_start"
ordered="false">start</CMI:Attribute>
        <CMI:Attribute name="method_stop"
ordered="false">stop</CMI:Attribute>
        <CMI:Attribute name="method_dispose"
ordered="false">dispose</CMI:Attribute>
    </CMI:Descriptor>
    <CMI:Descriptor name="installation"
type="InstallationDescriptor">
        <CMI:Attribute name="update_url"
ordered="false">http://www.testserver.com/MoneyTransfer</
CMI:Attribute>
        <CMI:Attribute name="update_protocol"
ordered="false">http</CMI:Attribute>
        <CMI:Attribute name="serialized_available"
ordered="false">true</CMI:Attribute>
        <CMI:Attribute name="installed_atomically"
ordered="false">false</CMI:Attribute>
    <CMI:Attribute name="package_name"
ordered="false">TestComponents</CMI:Attribute>
    </CMI:Descriptor>
    <CMI:Descriptor name="vendor" type="VendorDescriptor">
        <CMI:Attribute name="company_name"
ordered="false">Company Limited</CMI:Attribute>
        <CMI:Attribute name="company_web"
ordered="false">http://www.testserver.com/</CMI:Attribute>
        <CMI:Attribute name="company_email"
ordered="false">info@testserver.com</CMI:Attribute>
        <CMI:Attribute name="author_name"
ordered="false">Rohan Beckles</CMI:Attribute>
        <CMI:Attribute name="author_web"
ordered="false">http://www.testserver.com/people/development/
rohan.beckles/</CMI:Attribute>
        <CMI:Attribute name="author_email"
ordered="false">rohan.beckles@testserver.com</CMI:Attribute>
        <CMI:Attribute name="support_email"
ordered="false">support@testserver.com</CMI:Attribute>
        <CMI:Attribute name="bug_report_email"
ordered="false">bugs@testserver.com</CMI:Attribute>
    </CMI:Descriptor>
    </CMI:Descriptor>
</CMI>
```

To generate the in-memory object descriptor 68 illustrated in FIG. 7, the repository admin provider 71 parses the above XML file 64 to identify the descriptor labels and for each descriptor label, the attribute labels associated therewith. The repository admin provider 71 then creates attribute objects for each attribute found in the XML file 64 and associates it with the appropriate descriptor object 68. Once the descriptor object 68 for the component has been generated, the repository admin provider 71 adds it to the existing index 62 stored in the repository 7.

Modifications and Alternatives

In the above embodiment, the index 62 and the software components 70 were stored in the repository 7 provided locally to the server 3. As those skilled in the art will appreciate, the software components 70 can be stored in any location, provided their locations are known and can be provided to the client device 1.

Similarly, the index 62 of descriptors 68 can be provided remotely from the server 3. These remote repositories may be hosted in various types of databases such as Oracle 10i, IBM DB2, InterSystems Cache or as XML. If so, the query generated by the query generator 65 will have to be reformatted into a suitable format for querying the remote repository and similarly, the response from the remote repository will have to be reformatted before being passed to the response generator 73. Nevertheless, as the search results returned from the database will be fielded by the repository provider 69 and be internalised as descriptors and attributes, the internal workings of these remote databases will be irrelevant to the operation of the server.

The above embodiment makes use of Sun Microsystems' Java programming language, and in particular the client software is based on the Connected Device Configuration (CDC) of Java 2 Micro Edition (J2ME), the server on J2EE Java Servlet technology. However, as those skilled in the art will appreciate, this invention can also be implemented in, for example, Microsoft's C# language or .NET/.NET Compact platforms or others.

In the above embodiment, communications between client device 1 and server 3 were sent as plain text. An alternative would be to encrypt the parts of the client device request relating to the client device/interests using any suitable encryption techniques.

In the above embodiment, the client device 1 included a single application container 35 that operated in the above described manner. In an alternative embodiment multiple application containers may be provided on the client device 1. For example, one application container may be provided that relates to a gambling application, another application container may relate to an entertainment application. Each application container 35 preferably operates with its own server 3 and repository 7 of software components 70.

A further alternative is to provide a 'lobby' facility, wherein access to a number of component servers is provided from a single application container 35 running on the client device 1, with each component server providing access to applications particular to a specific set of services, perhaps from distinct service providers, much as a real-world lobby might offer access to a number of services and service providers from a common space. This may be implemented by including multiple 'interests' in the client config file 37, each one identifying an application that can be called and to which the user has subscribed.

In the above embodiment, the responses of the server 3 to the client device 1 were tailored to the client device according to known details of the client device hardware and software capabilities as defined in the received client request. Alternatively, the details of the client device hardware and software capabilities may be deduced from the characteristics of the client communication.

In the above embodiment, the client device 1 made a request of the server 3 from values stored in its config file 37, and received a response from the server 3 detailing matching components 70. Alternatively, the server 3 may first respond by updating the config file 37. For example, in the banking application embodiment presented above, the first request from the client device 1 specified profile_version=1.0. In response to the first query from the client device 1, the server 3 response could, according to policy, be to update the config file 37 in order to downgrade the profile version of the components 70 the client device 1 will search for, from profile_version=1.1 as in the original query, to profile_version=1.0. This could be done because, for example, a security flaw had been found in components 70 matching profile_version=1.1, and it was found necessary to use alternative components 70. In this case the response from the server 3 would take the form:

!search_config&package_name=Banking&arch=Java&arch_version=2&edition=ME&edition_version=1.0&profile=PersonalProfile&profile_version=1.0

Hence the client device config file 37, and therefore the client device 1 requests, may be dynamically configured from the server 3. A similar method could be used to provide suitable components 70 according to a tariff a user subscribes to. When the user authenticates at the server 3, a check is made to determine which tariff the user subscribes to, and a response from the server 3 as above may be used to change the client device config file 37 so that future requests will include a reference to the appropriate tariff.

In the above embodiment, one example was given of a 'banking' component, MoneyTransfer, searching for other components 70. As an alternative, a further example is now presented involving an image viewer component, which needs to call on other components 70 to help it decode a particular image file. Upon sending the configuration request to the server 3, the config file sent in response by the server 3 will contain "package_name=Imaging_Formats", informing the image viewer component that it can search for components 70 in the "Imaging_Formats" application package. When the image viewer component interrogates the image file, it may, for example obtain the filename suffix, and therefore the subsequent request it sends to the server 3, in order to find a suitable decoder component, will include this filename suffix information (e.g. JPEG), and therefore be of the form:

..&package_name=Imaging_Formats&format_suffix=jpg|JPG&format_magic=JPEG&format_MIME=image/jpeg In the above embodiment, a component which made requests for other components 70 only identified itself by name to the server 3 during the initial configuration request. Subsequent requests to the server were defined by the search config file, but the server 3 did not keep track of which component was making the request. In an alternative system, the server 3 may, when responding with the search config file, assign to the component a Globally Unique IDentity (a GUID) in the form of an alphanumeric string. For example:

!config&host=www.testserver.com&port=80&GUID=mj1d2b3h4f4455h5n67jb4g48i4h

When sending further requests back to the server 3, the calling component would append this GUID to its request. This could be done for reasons of security or for auditing purposes. For example, the GUID could be used to allow a user to run a restricted application. The user would have to undergo an authentication process in order to be permitted to download and run a particular component of the restricted application. This component would then be assigned a GUID for use in subsequent component requests.

For additional security, for example in financial services, a component such as MoneyTransfer could be programmed to download a user security component, which provides a further level of authentication, such as at the point where the user is asked to confirm the details of the money transfer.

In the above embodiment, the component data table 43 was populated from details contained in a response from the server 3 to an initial request from the client 1. In an alternative embodiment, the application container 35 may periodically update the component data table 43 by generating additional queries at later times. This allows the application container 35 or the calling component to be kept up to date with any changes that are made in the server 3.

In the above embodiment, data stored in the component data table 43 included details of the method_init attribute, used for initialising the associated component i.e. setting the component to its default configuration, in readiness for being started according to the method_start attribute. A discrete initialisation method, as described by the method_init attribute, can also be used to reset an already-started component.

In the above embodiment, the code provider 45 on the client device 1 used the HTTP protocol to fetch the required component from the repository 7 on the server 3. Alternatively, any other suitable communications protocol could be used, such as, for example, the file transfer protocol (FTP).

In the above embodiment, the descriptors 68 for each component 70 were stored in the index 62 as a set of Java objects. Similarly, the attribute objects associated with each descriptor were also stored as Java objects. In an alternative embodiment, the descriptors 68 and associated attributes for each component 70 may be defined by XML documents or even as text. In this case, the search of the index would comprise a text based search of the query terms against the text in the index.

In the above embodiment, the client devices 1 were mobile telephones. As those skilled in the art will appreciate, the client devices 1 can be other networked portable computing devices such as (but not limited to) personal digital assistants, gaming handhelds, digital set-top boxes, and in-car entertainment systems.

That which is claimed:

1. A computing system comprising:
a computer network;
a server connected to the computer network; and
a client device operable for communicating with said server over said computer network;
wherein said client device comprises at least one processor that executes an application shell software module that provides a dynamically configurable application in a piecemeal manner by individually downloading and loading a plurality of software components into the application shell software module, each software component being individually stored on the computer network and being downloaded and run by the client device when needed and being discarded from the client device after being run;
wherein said server receives, from the application shell software module, a request for available software components, controls a search of an index for available software components and transmits a response to said application shell software module providing details of available software components that were not identified in the received request, including, for each software component:
i) identification data identifying the software component;
ii) location data identifying a location from which the software component can be obtained; and
iii) start and stop data identifying how to start and stop the software component;
wherein said application shell software module:
i) receives said details of available software components from said server;
ii) retrieves a selected software component from the location identified by said location data for the selected software component; and
iii) starts and stops the selected software component within the application shell software module in accordance with the received start and stop data.

2. The system according to claim 1, wherein said software components are stored in different locations within a common store connected to said computer network.

3. The system according to claim 1, wherein said application shell is operable to transmit a text string request for available software components and wherein said server is operable: i) to receive said text string request for available software components from the application shell software module; ii) to parse the text string request and to generate a query using the text in the request; and iii) to control the search of said index for available software components using the query.

4. The system according to claim 1, wherein said server is operable to transmit a text string response to said application shell software module providing details of available software components, including, for each software component: i) text identifying the software component; and ii) text identifying a location from which the software component can be obtained; wherein said application shell software module is operable: i) to receive said text string response; ii) to parse the received text string response to obtain the text identifying the available software components and the text identifying the locations of the available software components; and iii) to retrieve and run a selected software component using the text identifying the location of the selected software component.

5. A client device comprising:
a processor that executes an application shell software module that provides a dynamically configurable application in a piecemeal manner by individually downloading and loading a plurality of software components into the application shell software module, each software component being individually stored on the computer network and being downloaded and run by the client device when needed and being discarded from the client device after being run; and
wherein said application shell software module:
i) sends a request for available software components to a remote server so that the remote server can control a search of an index for available software components;
ii) receives from the remote server details of available software components that were not identified in the sent request which details include, for each software component:
a) identification data identifying the software component;
b) location data identifying a location from which the software component can be obtained; and
c) start and stop data identifying how to start and stop the software component;
iii) retrieves a selected software component from the location identified by said location data for the selected software component; and
iv) starts and stops the selected software component within the application shell software module in accordance with the received start and stop data.

6. The client device according to claim 5, wherein said application shell software module is operable: iv) to start the component and, once the component is no longer required, to stop the component in accordance with the start and stop data.

7. The client device according to claim 6, wherein said start and stop data causes said application shell software module to remove the software component from the memory of the client device.

8. The client device according to claim 5, wherein said application shell software module comprises a request generator for constructing and sending said request to said server from information obtained from a configuration file containing configuration information for or about said client device.

9. The client device according to claim 5, wherein said application shell software module comprises: a response receiver for receiving said server's response and for populating a component data table for each available software component with the corresponding details for the software component data contained within the response.

10. The client device according to claim 5, wherein said application shell software module comprises: a code provider for retrieving the selected component; and an application container in which the retrieved software component is run.

11. The client device according to claim 5, wherein said application shell software module is a Java object.

12. The client device according to claim 5, wherein said software components are single-purpose units of code that each perform a specific function.

13. The client device according to claim 5, wherein each software component is operable to implement a substantially different part of the dynamically configurable application's functionality, that part being small in relation to the overall size of the dynamically configurable application.

14. The client device according to claim 5, wherein said application shell software module is operable: to identify, to a user, the available software components for user selection in accordance with the received data identifying the available software components; in response to receiving a user selection of a software component, to retrieve the selected software component from the location identified by said location data; and to start and stop the retrieved software module in accordance with the start and stop data.

15. The client device according to claim 5, wherein said client device is a smart telephone.

16. The client device according to claim 5, wherein said application shell is operable to retrieve said software components by downloading them from said location using a standard download protocol.

17. The client device according to claim 5, wherein said client device is battery powered and comprises solid state memory only.

18. The client device according to claim 5, wherein said software components are retrieved and run in volatile memory only.

19. The client device according to claim 5, wherein said client device comprises a plurality of application shells, each associated with a respective different server on said network, and wherein, when the client device is running one of said application shells, the client device is operable to communicate with the corresponding server associated with that application shell.

20. The client device according to claim 5, wherein said application shell is operable to provide multiple dynamically configurable applications, each associated with a respective server, and wherein said client device is operable to connect to a selected one of said servers in dependence upon a selected one of said dynamically configurable applications.

21. A non-transitory computer program product comprising at least one computer-readable medium having computer implementable instructions embodied thereon, the computer implementable instructions being configured to be executable by a processor to:
  execute an application shell software module that provides a dynamically configurable application in a piecemeal manner by individually downloading and loading a plurality of software components into the application shell software module, each software component being individually stored on a computer network and being downloaded and run by a client device when needed and being discarded from the client device after being run;
  send, via the processor, a request for available software components to a remote server so that the remote server can control a search of an index for available software components;
  receive, from the remote server, details of available software components that were not identified in the sent request, which details include for each software component:
    a) identification data identifying the software component;
    b) location data identifying a location from which the software component can be obtained; and
    c) start and stop data identifying how to start and stop the software component;
  retrieve a selected software component from the location identified by said location data for the selected software component; and
  start and stop the selected software component within the application shell software module in accordance with the received start and stop data.

22. A server comprising a processor that is operable to:
  receive, from an application shell software module running on a client device, a request for available software components, wherein the application software module being executed to provide a dynamically configurable application in a piecemeal manner by individually downloading and loading a plurality of software components into the application shell software module, each software component individually stored on a computer network and being downloaded and run by the client device when needed and being discarded from the client device after being run,
  control a search of an index for available software components that are not identified in the received request, and
  transmit a response to said application shell software module providing details of available software components, including, for each software component:
    i) identification data identifying the software component;
    ii) location data identifying a location from which the software component can be obtained; and
    iii) start and stop data identifying how the application shell software module can start and stop the software component, so that the application shell software module can retrieve a selected software component from the location identified by said location data for the selected software component and can start and stop the selected software component within the application shell software module in accordance with the received start and stop data for the selected software component.

23. The server according to claim 22, wherein said index is stored in a repository and wherein said server comprises: a query generator for translating said received request for said available software components into a query suitable for use in querying said index in said repository; a repository provider for searching said index in said repository for said available software components using said query; and a response generator for generating said response from search results obtained from said repository provider.

24. The server according to claim 22, wherein said server comprises a repository admin provider for maintaining said index of said software components.

25. The server according to claim 24, wherein said repository admin provider is operable to maintain said index by updating said index to include new components.

26. The server according to claim 24, wherein said repository admin provider is operable to maintain said index by updating said index to remove legacy software components.

27. The server according to claim 22, wherein said available software components are the subset of all possible software components determined in dependence upon data contained in the received request.

28. The server according to claim 27, wherein said server is operable to identify said subset of available software components by matching data received in the request with data stored for each software component in the index.

29. The server according to claim 22, wherein the location of each software component is identified by a Uniform Resource Locator.

30. The server according to claim 22, wherein said index comprises a plurality of descriptors, each descriptor being associated with a respective one of a plurality of software components and comprising a plurality of descriptor nodes each hiving a plurality of attribute key-value pairs relating to the associated software component;

wherein said search of the index is performed by matching attribute key-value pairs defined within said received request with the attribute key-value pairs of each descriptor; and wherein the server is operable to provide, in said response, details of software components for which a match is found between the attribute key-value pairs of the request and the attribute key-value pairs of the associated descriptor.

31. The server according to claim 22, wherein said index comprises a plurality of descriptor Java objects, each descriptor object being associated with a respective one of a plurality of software components and having a plurality of associated attribute Java objects each defining an attribute key-value pair relating to the associated software component;

wherein said search of the index is performed by matching attribute key-value pairs defined within said received request with the attribute Java objects associated with each descriptor Java object; and wherein the server is operable to provide, in said response, details of software components for which a match is found between the attribute key-value pairs of the request and the attribute Java objects of the associated descriptor Java object.

32. The server according to claim 22, wherein said server is operable to determine user subscription data for the user of the client device and is operable to control the search of said index so that said response does not include details of available software components for which the user has not subscribed.

33. A non-transitory computer program product comprising at least one computer-readable medium having computer implementable instructions embodied thereon, the computer implementable instructions being configured to be executable by a processor to:

receive, from an application shell software module running on a client device, a request for available software components, wherein the application shell software module being executed to provide a dynamically configurable application in a piecemeal manner by individually downloading and loading a plurality of software components into the application shell software module, each software component individually stored on a computer network and being downloaded and run by the client device when needed and being discarded from the client device after being run, control, via the processor, a search of an index for available software components that are not identified in the received request, and transmit, via the processor, a response to said application shell software module providing details of available software components, including, for each software component:

i) identification data identifying the software component;

ii) location data identifying a location from which the software component can be obtained; and iii) start and stop data identifying how the application shell software module can start and stop the software component, so that the application shell software module can retrieve a selected software component from the location identified by said location data for the selected software component and can start and stop the selected software component within the application shell software module in accordance with the received start and stop data for the selected software component.

\* \* \* \* \*

UNITED STATES PATENT AND TRADEMARK OFFICE
CERTIFICATE OF CORRECTION

PATENT NO. : 8,312,451 B2
APPLICATION NO. : 12/467026
DATED : November 13, 2012
INVENTOR(S) : Poole et al.

It is certified that error appears in the above-identified patent and that said Letters Patent is hereby corrected as shown below:

Column 9

Line 53, "&method_dispose=d1spose" should read --&method_dispose=dispose--

Signed and Sealed this
Twenty-sixth Day of February, 2013

Teresa Stanek Rea
*Acting Director of the United States Patent and Trademark Office*